W. J. TAYLOR.
Process for the Manufacture of Gas.
No. 206,053.          Patented July 16, 1878.
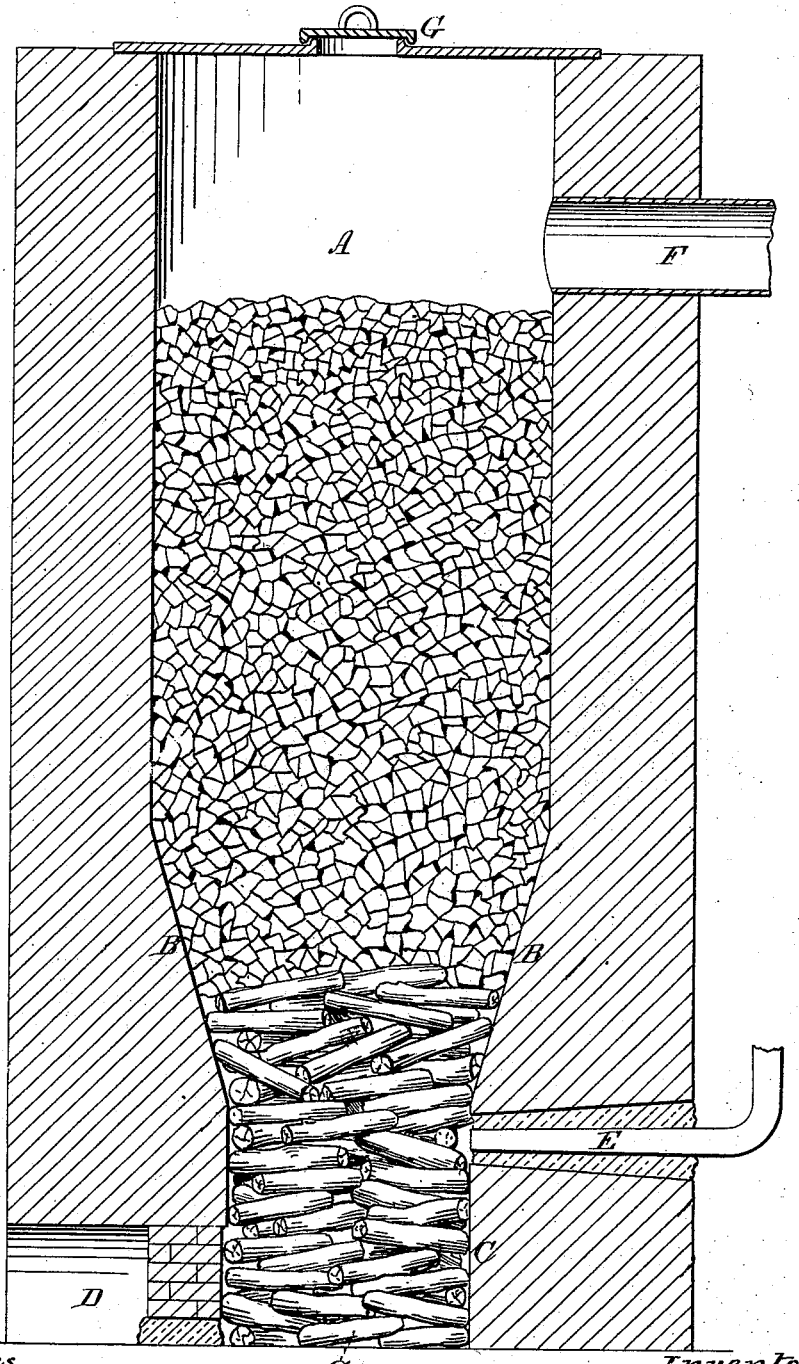

UNITED STATES PATENT OFFICE.

WILLIAM J. TAYLOR, OF CHESTER, NEW JERSEY.

IMPROVEMENT IN PROCESSES FOR THE MANUFACTURE OF GAS.

Specification forming part of Letters Patent No. 206,053, dated July 16, 1878; application filed October 12, 1877.

*To all whom it may concern:*

Be it known that I, WILLIAM J. TAYLOR, of Chester, in the county of Morris and State of New Jersey, have invented certain new and useful Improvements in Processes for the Manufacture of Gas; and I do hereby declare that the following is a full, clear, and exact description thereof, which will enable others skilled in the art to which it appertains to make and use the same, reference being had to the accompanying drawing, and to letters of reference marked thereon, which form a part of this specification.

In the ordinary operation of blast or metallurgic furnaces gas is produced for heating purposes. The carbonic-oxide gas in such furnaces that is not utilized in the reduction of the ores is otherwise used. In such furnace two things are produced, viz., the metal and the cinder or slag, both in a liquid state, and are so tapped out through different tap-holes. This operation is made continuous, and the metal, being heavier than the cinder, settles to the bottom of the hearth or crucible, while the slag or cinder covers the top, and is frequently tapped out through the cinder-notch or tap-hole, which is some distance above the tap-hole for the metal, in order to make room for the accumulation of molten metal. In this operation the earthy or non-combustible matter in the fuel passes off as liquid slag; but in this case the object is to reduce ores to a metallic state, and not for the purpose of making gas; but the resulting gases not used for the reduction or deoxidation of the ores are utilized for heating purposes. In such furnaces the earthy matter in both the ore and coal must be fluxed off.

My process is essentially different from that conducted in a metallurgic furnace, in the particulars that only the earthy matter in the fuel is fluxed, the heat generated is used for the production of gas, the fuel is used for such production, and none of the gases are oxidized or changed in the operation, as there is necessarily no oxidizing agent.

In metallurgic furnaces the gases coming in contact with ores which are oxides are more or less oxidized at once, while in my process there is no reducing agent, and therefore no reduction whatever.

Heretofore, in the manufacture of gas solely for heating purposes from mineral and other fuels by setting free the hydrogen and hydrocarbons by heat and burning the carbon into carbonic oxide, the generating process has been rendered very imperfect and unsatisfactory by irregularity of combustion of the fuel, owing to the caking of coal, the formation of holes in the fire, through which carbonic-acid gas and air may pass up and mix with the already-formed carbonic acid, air admissions due to the irregular formation and removal of clinkers, and the formation in the producer of beds of ashes and scoriæ at irregular intervals.

It has also been impossible, even with the most careful attention, to prevent the burning of some gas above the bed of fuel in the ordinary heating-gas producer.

A process entirely free from all the disadvantages heretofore enumerated, and a producer in which said process may be carried on and a uniform quality and quantity of gas produced continuously, are the objects of my invention.

My process consists, essentially, in charging into a properly-constructed producer a sufficient quantity of lime or other fluxing material with the fuel to be made into gas, and applying an air-blast continuously through a small tuyere or tuyeres under a sufficient pressure to maintain a high temperature, whereby the fluxing material is kept constantly in a molten or fluent state, and which is tapped out to maintain the continuous process, so that everything that is charged into the producer is either burned or fluxed off when the furnace-heat is augmented by a suitable blast of air, the drawing off the cinder in its liquid state being effected at proper intervals and before it rises above the tuyere or tuyeres. In connection with this continuous process I introduce steam in the air-blast, for the purpose of enriching the gas by the addition of free hydrogen by lessening the quantity of the nitrogen; but such steam-jet must be regulated so as not to reduce the temperature of the lower part of the producer below the point necessary for decomposing water or steam and the melting-point of the cinder.

Thus, instead of producing ashes and clinkers from the non-combustible matter contained in the fuel, with the resultant difficulties heretofore mentioned in gas-producers now in use, I remove it thoroughly in the shape of a fluent slag or cinder, and am thus able to maintain an absolutely continuous flow of gas for an indefinite time, and of uniform volume and quality, by simply keeping up the charge of fuel and flux and tapping out the liquid cinder as fast as it fills up the reservoir provided for it in the bottom of the producer.

This producer I will now proceed to describe, and explain the manner of using the same in carrying out my process, referring to the drawing, which represents a vertical section of one form of a fluxing-gas producer.

The interior of the fluxing-gas producer is in the shape of a plain cylinder, A, the lower portion B being contracted to form a reservoir or crucible, C, from the bottom or hearth of which a tap-passage, D, opens outward, and is stopped and opened in the same manner as the tapping-hole of a metallurgic furnace.

At the top of the reservoir C is arranged in the wall of the producer a tuyere, E, through which the air-blast is supplied; and near the top of the producer a pipe, F, leads through the wall, for the purpose of conveying the generated gas to the place where it is to be used.

The top of the generator is provided with a lid, G, which is removed when charging. A blower capable of a high pressure should be connected with the tuyere.

To start the producer, it should be fired up about in the same manner as a cupola or blast furnace, viz., with wood in the bottom, or reservoir, or higher if necessary, and coal on top to any desired height, the coal being mixed, as before stated, with a sufficient amount of lime or other fluxing material to unite with the non-combustible matter in the fuel and cause its fusion into a very fluent slag or cinder. After the wood is well ignited I admit the blast through the tuyere under a sufficient pressure to make and maintain a high temperature at or near the bottom of the producer.

By using a strong blast, forced into the producer through small tuyeres, I am enabled to maintain the high temperature in the lower part without allowing much heat to creep upward, or the fuel to get hot on top, so that the gas is comparatively cool on leaving the producer, and can be conveyed in ordinary iron pipes wherever required.

There is no disadvantage in maintaining a high temperature in the bottom of my producer, as it is believed no more carbonic acid ($CO^2$) is made in burning carbon (C) into carbonic oxide (CO) at a high temperature than a low one, and, if there is any difference, I think it is in favor of active combustion and high temperature, for it is generally acknowledged now that there is scarcely a trace of carbonic acid near the tuyeres of a blast-furnace.

As a fluxing material to cause fusion of the non-combustible matter in the fuel in my gas-producer, I find in practice that a limy furnace-cinder—that is, a cinder not fully impregnated with silica—answers my purpose very well. When twenty to forty per cent. of this is mixed with the charge of fuel all the non-combustible matter of the coal unites with it, and all can be readily tapped out as liquid cinder, so that all the fuel or gas-producing material is absolutely utilized.

By the use of my process and producer I am enabled to make gas from any kind of fuel, from the best coal, either coarse or fine, to inferior peat, or from coal-dust or breeze. In fact, almost anything in the shape of fuel may be used that contains a sufficient amount of carbon or combustible matter to generate, with the aid of the blast, the requisite amount of heat in burning it. Care must be taken, however, to increase the fluxing material in the proportion that the non-combustible matter is increased by using lean fuels.

For the purpose of enriching the gas by the addition of free hydrogen and lessening the quantity of nitrogen, a jet of steam may be used in the air-blast; but care must be taken not to admit enough steam to reduce the temperature of the lower part of the producer below the point necessary for decomposing water or steam and the melting-point of the cinder.

What I mean by the addition of free hydrogen and lessening the quantity of nitrogen by the introduction of a jet of steam is that free hydrogen is a powerful heating-gas, and all the carbonic oxide made from the oxygen thus separated from the hydrogen is better for heating purposes, because it is not diluted with nitrogen, as is the case with carbonic oxide made from the oxygen of the air.

In all heating-gas producers of which I have any knowledge a large per cent. of the fuel is wasted in keeping them in working condition, and much time is lost in cleaning. Even in the event of using the waste fuel over again, there is much loss in time and labor, such waste fuel coming through the grates and openings for removing clinkers.

It involves no inconsiderable labor and trouble, as well as loss of time, to keep all producers heretofore in use, and which are non-fluxing, in working condition, and all the trouble and disadvantage of using such a producer my new fluxing-producer effectually obviates.

I do not confine myself to a vertical or circular form of producer, smaller or larger at the bottom. It may be round or square, or any other convenient form, and not vertical. Nor do I confine myself to one tuyere or one tapping-hole, nor one escape for the gas, nor one charge-hole; but either or all of these may be multiplied, as described.

Another important advantage in my producer is, that I find in practice I can make a large or small volume of gas by simply regulating the size of the tuyere or tuyeres and the amount of air forced in, which increases or decreases combustion, and consequently increases or decreases the resulting volume of gas, the variation being probably three to four fold—that is, a producer in which the maximum capacity is, say, five tons of coal per day could be reduced to one ton per day, and still maintain a sufficiently high temperature for fluxing, and not interfere with the regular, uniform, and continuous working of the producer.

In using coarse fuel, a single tuyere or a tuyere of sufficient area would be all that is necessary; but in using fine fuel or coal-dust it would be better to divide the area of the single tuyere into two or more tuyeres, in order to effect a more equal distribution of the air-blast.

In such case a higher air-blast pressure would be desirable for more effectual work, on account of the compactness of such fuel, which hitherto has prevented its use for the production of gas, because a non-fluxing producer of any kind is not adapted for its use.

When it is considered how inexpensive such fuel is, and how abundant as a refuse in coal-mining regions, the great importance of my invention becomes apparent.

A fluxing-gas producer is not new, broadly considered; and I am aware that a gas blow-pipe has been devised for this purpose, and in which is charged breeze, or small cokes, cinders, or refuse from the fires, together with a portion of lime to flux the clinkers and ash, and which runs out at a bottom cinder-hole, said gas-producing blow-pipe having a blast-pipe for generating the gas and another for effecting the combustion of the gases while passing from the blow-pipe. The operation of such device, however, is intermittent, being designed for only a few minutes' blowing of the gas into the receiver; but such intermittent blowing would render my process useless and impracticable, because the frequent stopping of the blast would chill the hearth so that the slag could not be tapped out, and the fluxing operation would cease. Frequent interruptions would render it impossible to make good and uniform gas, and without such gas the process and the producer would be worthless. If the producer worked either too hot or too cold, the combustible gases formed would be constantly vitiated by either air or carbonic acid. If the fuel is incandescent only at the bottom, air, if not also carbonic acid, must pass unchanged through the cold fuel above. If the whole mass of fuel is very hot, carbonic acid is forming at the top. In short, the only practical way to work a fluxing-gas producer is to work it continuously and under regular and uniform conditions.

My invention lies not in the mere use of flux in a blast-producer, but in such process of gas-manufacture that the slag will not chill, and that the gas will be uniform in character.

I claim—

1. The process of manufacturing gas, which consists in charging into the producer a fluxing material with the fuel to be made into gas, and applying an air-blast continuously through a small tuyere or tuyeres under sufficient pressure to maintain a high temperature, whereby the fluxing material is kept constantly in a molten or fluent state, and which is tapped out to maintain the continuous process, substantially as described.

2. The process of manufacturing gas, which consists in charging into the producer a fluxing material with the fuel to be made into gas, and applying an air-blast continuously through a small tuyere or tuyeres under a sufficient pressure to maintain a high temperature, whereby the fluxing material is kept constantly in a molten or fluent state, and which is tapped out to maintain the continuous process, and the introduction of steam in such air-blast, substantially in the manner and for the purpose herein set forth.

In testimony that I claim the foregoing I have affixed my signature in the presence of two witnesses.

WILLIAM J. TAYLOR.

Witnesses:
 A. E. H. JOHNSON,
 J. W. HAMILTON JOHNSON.